United States Patent [19]

Lang

[11] Patent Number: 5,469,764

[45] Date of Patent: Nov. 28, 1995

[54] DUAL HANDLE LUG WRENCH

[76] Inventor: Richard A. Lang, P.O. Box 268, Abita Springs, La. 70420

[21] Appl. No.: 215,097

[22] Filed: Mar. 21, 1994

[51] Int. Cl.$^6$ .................................................. B25B 23/16
[52] U.S. Cl. ......................................... 81/177.2; 81/121.1
[58] Field of Search ............................... 81/121.1, 177.2

[56] References Cited

U.S. PATENT DOCUMENTS

| | | | |
|---|---|---|---|
| 3,424,039 | 1/1969 | Scott | 81/177.2 |
| 3,779,106 | 12/1973 | Cavicchi | 81/121.1 |

*Primary Examiner*—James G. Smith

[57] ABSTRACT

A dual handle lug wrench unit having a first element consisting of a conventional single handle lug wrench with a straight member terminating in a socket and an obliquely angled handle member; a second element having a straight member with a notched lower end and a rigid handle member; a pair of collars with screws to clamp the collars tightly to said straight members of both elements; upon loosening of the screws, the second element straight member can slide with respect to the first element and the handle of the second element rotated into a storage position; the first of the collars being positioned adjacent the handles and the second collar attached near the working end and having a rigid projection that interfits with the notched lower end of the second element.

2 Claims, 4 Drawing Sheets

DUAL HANDLE LUG WRENCH

BACKGROUND OF THE INVENTION

1. Field of the Invention

The present invention relates to lug wrenches and more particularly pertains to such a wrench which has the torque capability of a multi-handle lug wrench and the storability of a single handle lug wrench.

2. Description of the Prior Art

The use of lug wrenches is known in the prior art. More specifically, such wrenches heretofore devised and utilized for the purpose of loosening lug nuts are known to consist basically of familiar, expected and obvious structural configurations, notwithstanding the myriad of designs encompassed by the crowded prior art which have been developed for the fulfillment of countless objectives and requirements. Usually, particularly for carrying in a motor vehicle, a single handle lug wrench has been used to facilitate storage when not in use. The art has recognized the difficulty of achieving sufficient leverage and torque with such a device to free lug nuts frozen in place on a wheel and has suggested means to add longer handles or multiple handles to solve the problem. Typical of such devices are those shown in U.S. Pat. Nos.: 4,691,599; 4,733,583; 4,875,395; 4,819,523; and U.S. Pat. No. Des. 327,397. All of these devices either cause problems in storage or in the case of handle extensions such as in U.S. Pat. No. 4,819,523 or U.S. Pat. No. 4,733,583 awkwardness in use, particularly in tight quarters.

In this respect, the lug wrench according to the present invention substantially departs from the conventional concepts and designs of the prior art, and in so doing provides an apparatus primarily developed for the purpose of exerting the torque of a multi-handle wrench and yet the compact storability of a simple handle wrench.

Therefore, it can be appreciated that there exists a continuing need for new and improved lug wrenches which can be easily stored and used and yet exert substantial torque. In this regard, the present invention substantially fulfills this need.

SUMMARY OF THE INVENTION

In view of the foregoing disadvantages inherent in the known types of lug wrenches now present in the prior art, the present invention provides an improved lug wrench construction wherein the same overcomes such disadvantages. As such, the general purpose of the present invention, which will be described subsequently in greater detail, is to provide a new and improved lug wrench which has all the advantages of the prior art devices and none of the disadvantages.

To attain this, the present invention relates to a dual handle lug wrench unit having the storage advantage of a single handle lug wrench and the torque capabilities of a multi-handle lug wrench which comprises: a first element consisting of a conventional single handle lug wrench having a rigid straight member terminating in a lug socket as one end and a rigid angled handle member at the other end; a second element having a rigid straight member with a notched lower end adapted to fit over a circular stud and a rigid angled handle member at the other end similar to said first handle member; a pair of adjustable screw members in each of said collars to clamp said collars tightly to said straight sections or to loosen said collars to permit movement thereof about the straight section of said first element and to permit the straight section of said second element to slide longitudinally with respect to the straight section of said first element; the first of said adjustable collars being positioned adjacent said angled handle members and having an interior surface free of any projections; the second of said collar members being spaced near said first collar member and having a rigid circular stud projecting inwardly therein. In operation, the unit is stored with the handle members parallel and in engagement with each other. For use, the collars are loosened and permit the second handle to be swung away from the first handle to any desired degree and the notched lower end of the second element to be slid into engagement with and over the circular stud of the second collar. The collars are then clamped to fasten the two elements tightly together and both handles can be used to apply torque to a lug nut engaged in the socket of the first element.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved lug wrench which has all the advantages of the prior art devices and none of the disadvantages.

It is another object of the present invention to provide a new and improved lug wrench which may be easily and efficiently manufactured and marketed.

It is a further object of the present invention to provide a new and improved lug wrench which is of a durable and reliable construction.

An even further object of the present invention is to provide a new and improved lug wrench which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved lug wrench which provides in the apparatuses of the prior art some of the advantages thereof, while simultaneously overcoming some of the disadvantages normally associated therewith.

Yet another object of the present invention is to provide a new and improved lug wrench which is easily storable.

Even still another object of the present invention is to provide a new and improved unit which can convert a conventional single handle lug wrench to a multi-handle unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
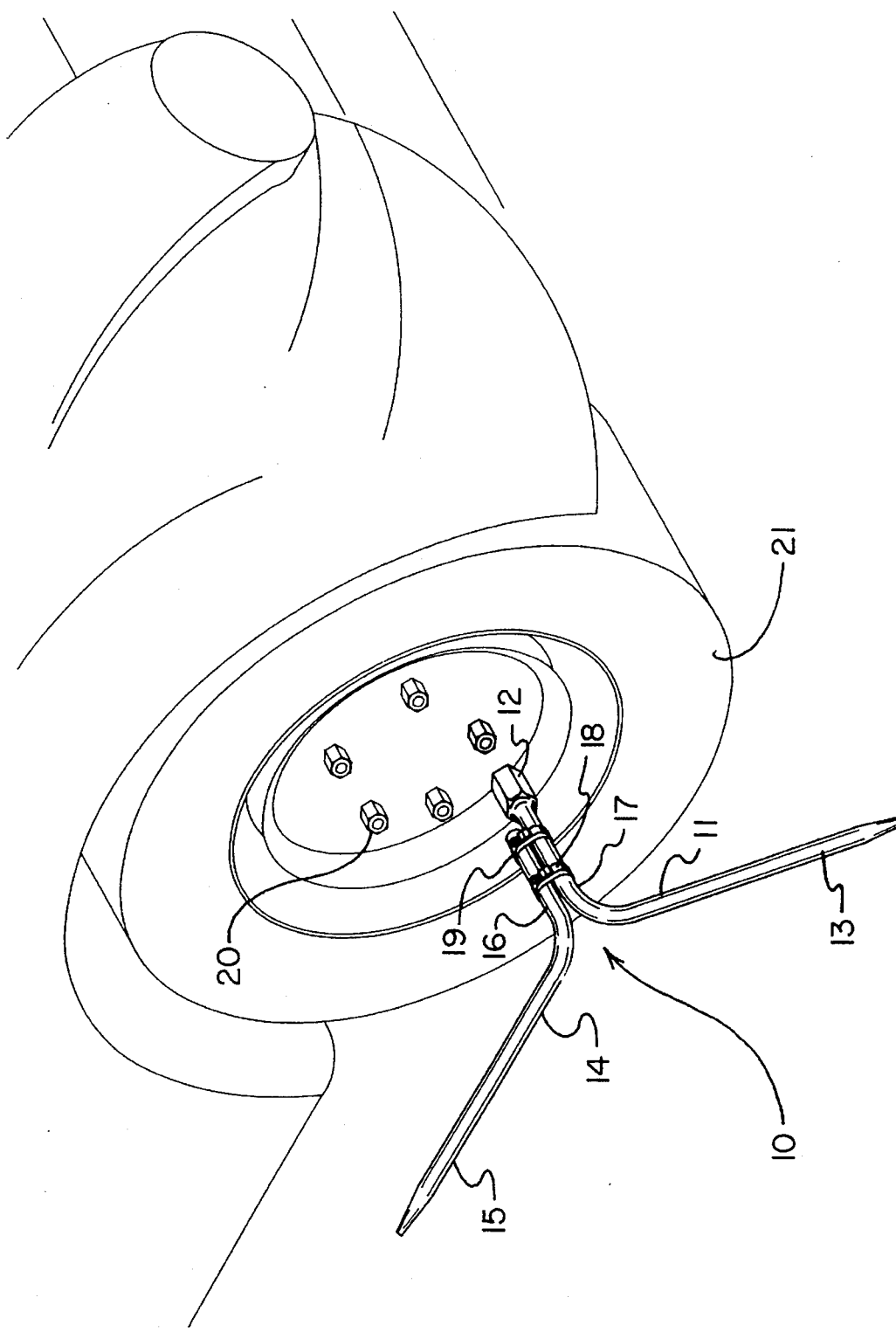
FIG. 1 is a perspective view of the device of the present invention engaging the lug nuts of an automobile wheel.

With reference now to the drawings, and in particular to FIG. 1 thereof, a new and improved lug wrench embodying the principles and concepts of the present invention and generally designated by the reference numeral 10 will be described.

More specifically, it will be noted that the device 10 of the present invention comprises, as a first element, a conventional lug wrench 11 having a socket 12 on one end and an angled handle 13 on the other end. A second element 14 has a handle 15 similar to handle 13 and a straight section 16 similar to straight section 17 of the conventional wrench 11. Instead of terminating in a lug socket 12, the straight section 16 of this second element terminates in a notch (not shown in this view). The second element 14 is movably affixed to wrench 11 by a pair of adjacent collars 18 and 19. Details of the collar 18 and 19 and the cooperation thereof with the second element 14 are shown in subsequent drawings. Once the lug socket 12 is placed over the lug nuts 20 of an automobile wheel 21, the operator applies leverage with both hands, one on each handle, gaining a substantial increase in torque and ease of operating as compared to a single handle lug wrench.

Figure 2:
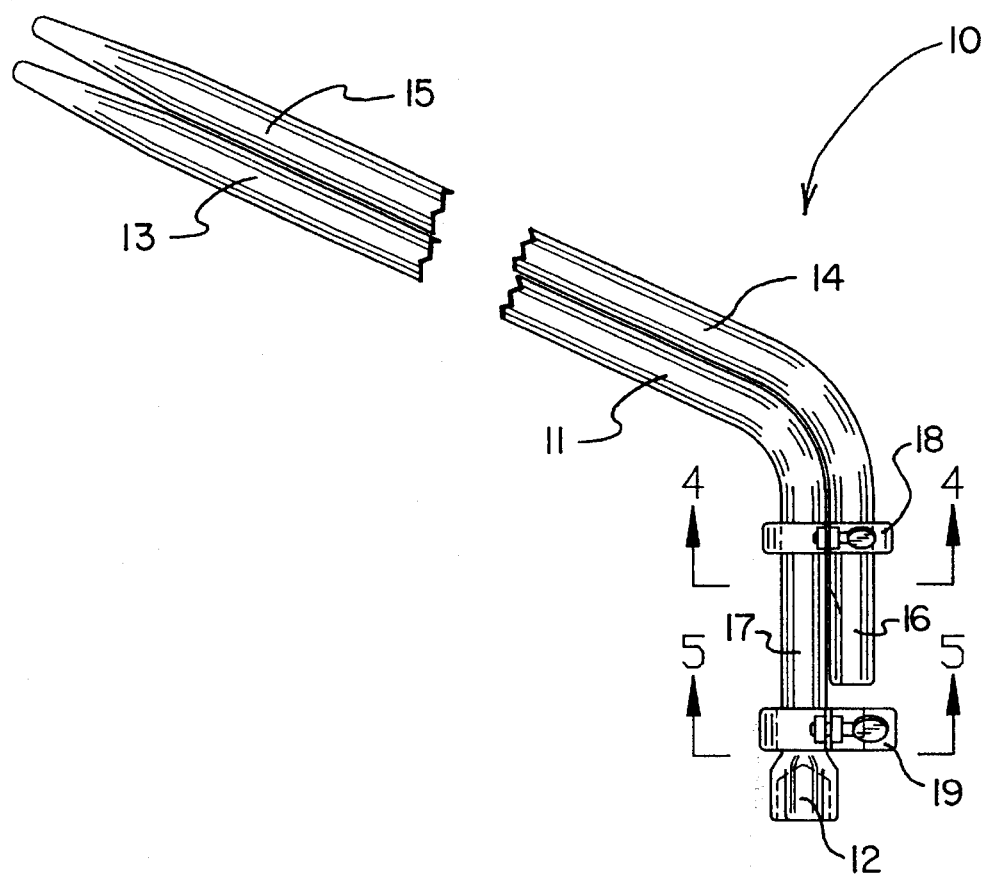
FIG. 2 is a side plan view of the device of the present invention in its storage configuration.

FIG. 2 shows that the units 10 will fold in to a single size very comparable to that of the conventional lug wrench for storage. Handles 13 and 15 lie in parallel contact with one another making a compact package.

Figure 3:
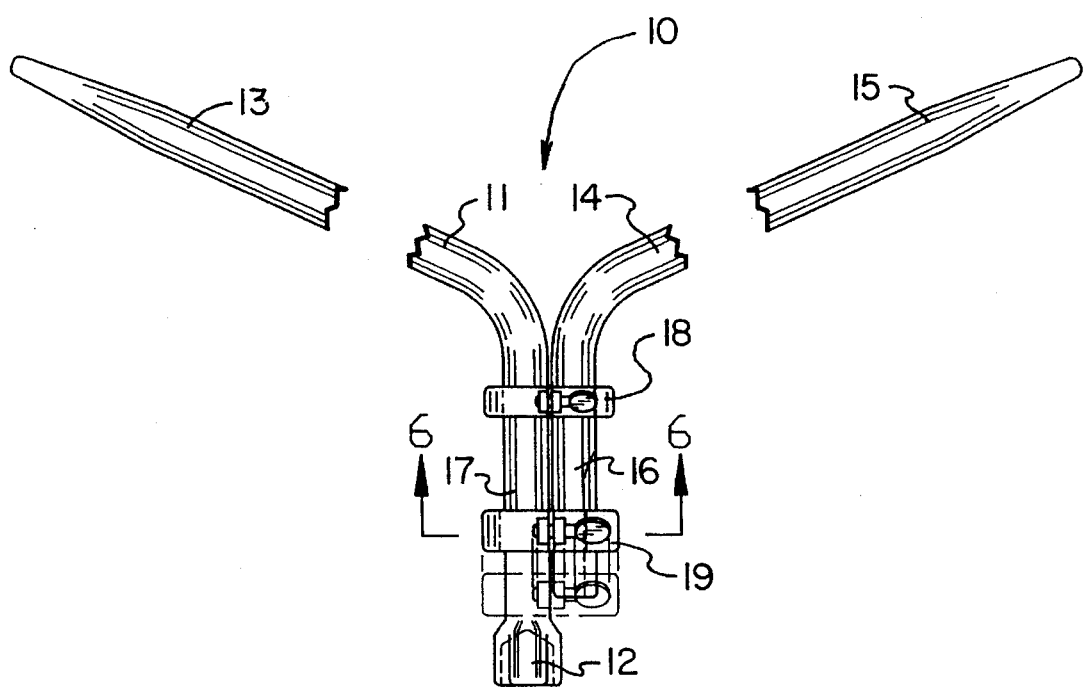
FIG. 3 is a side plan view of the device of the present invention in its operating configuration.

FIG. 3 shows handles 13 and 15 swung apart in operating position as shown in FIG. 1. The broken line position of collar 19 illustrates that collars 18 and 19 may be slid up or down on the straight section 17 as desired. In this view, the straight section 16 of elements 14 is shown dropped down through collar 19 as contrasted to the storage position shown in FIG. 2.

Figure 4:
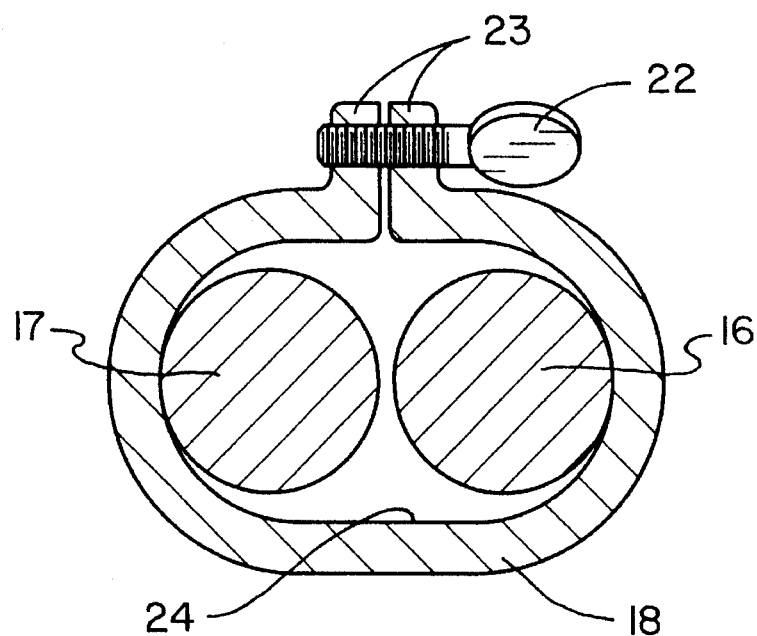
FIG. 4 is a sectional view taken on line 4—4 of FIG. 2.

FIG. 4 taken on line 4—4 of FIG. 2 shows the collar 18 in detail. Straight sections 16 and 17 of the first element wrench 11 and second element 14 are encased within collar 18 by tightening the threaded wing bolts 22 in flanges 23 of collar 18. Collar 18 is positioned adjacent the juncture of angled handles 13 and 15 and has an interior 24 clear of any protruberences.

Figure 5:
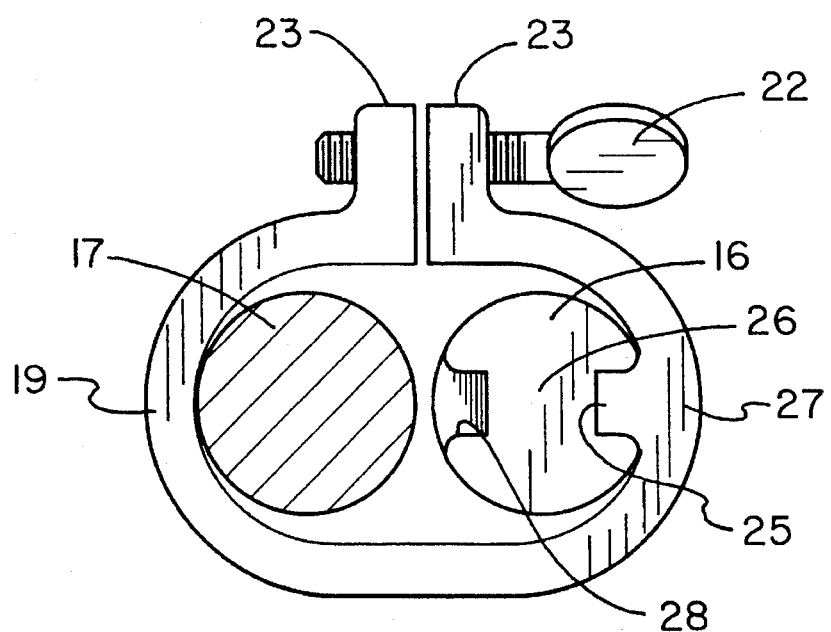
FIG. 5 is a sectional view taken on line 5—5 of FIG. 2.
Figure 6:
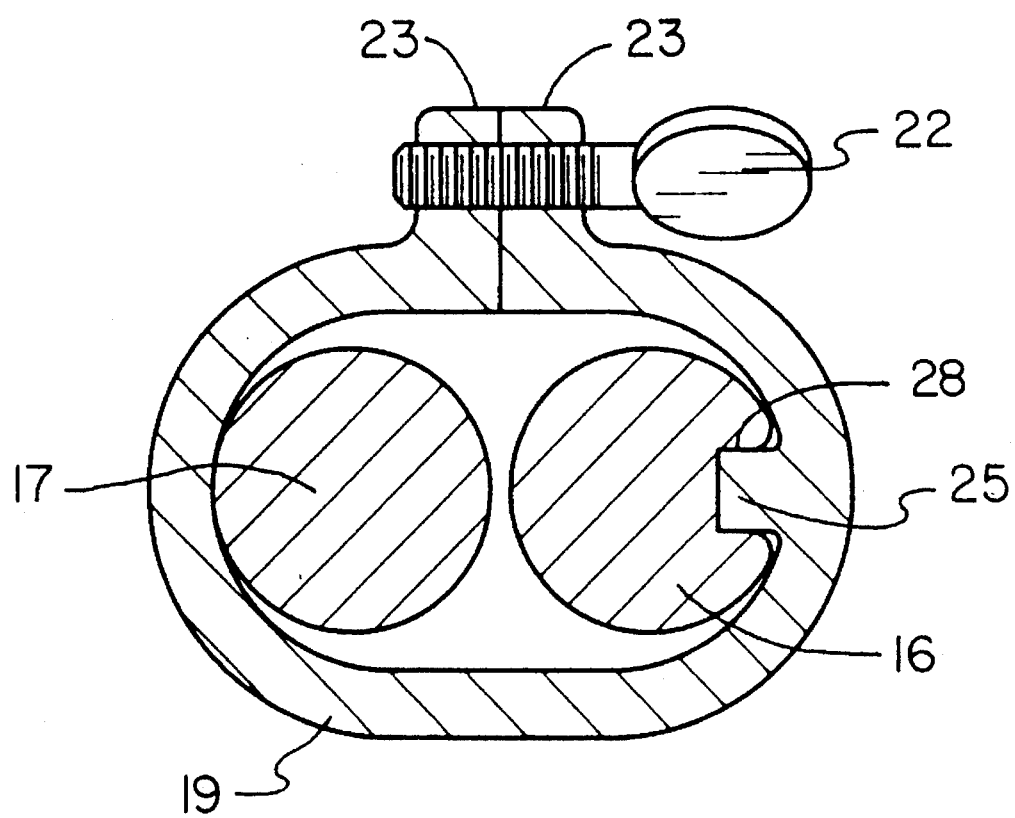
FIG. 6 is a sectional view taken on line 6—6 of FIG. 3.

FIG. 5, taken on line 5—5 of FIG. 2 shows the straight section 16 and 17 with the tool 10 in the storage position. Collar 19 (positioned nearest the lug socket end 12 of the tool 10) has a rigid stud 25 (preferably circular) protruding into the interior 26 of collar 19 from the wall 27 thereof. Notch 28 (mentioned in connection with FIG. 1) in straight section 16 of element 14 is visible in this view and, in use, will be rotated 180 degrees within collar 19 to engage with stud 25 as shown in FIG. 6 in one position only as indicated in FIG. 6 Flanges 23 of collar 19 are pulled together by using bolt 32, tightly locking straight sections 16 and 17 to each other.

Once notch 28 engages with stud 25 and is locked therein by tightening collars 18 and 19, the handle 15 of second element 14 cooperates with handle 13 on lug wrench 11 in exerting a turning force a on lug nut to which socket 12 is applied. Collars 18 and 19 may be rotated on the straight section 17 of lug wrench 11 to orient handle 15 as required before locking element 14 are in place.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual handle lug wrench comprising:

a lug wrench having a socket, a first straight section extending colinearly from the socket, and a first handle projecting from the first straight section, the first straight section and socket including a first longitudinal axis directed therethrough, with the first handle projecting from the first straight section at an oblique angle relative to the first longitudinal axis thereof, the first handle having a first handle longitudinal axis directed therethrough;

a second element including a second straight section positioned in a parallel and abutting relationship relative to the first straight section of the lug wrench, the second element further including a second handle extending from the second straight section, the second straight section including a second longitudinal axis directed therethrough, with the second handle projecting from the second straight section at an oblique angle relative to the second longitudinal axis thereof, the second straight section being shaped so as to define a notch extending longitudinally along an exterior surface thereof and from a lower end thereof a predetermined distance along the exterior surface of the second straight section, the first straight section being of a first length, and the second straight section being of a second length, wherein the first length is substantially greater than the second length, the second handle having a second handle longitudinal axis directed therethrough;

a first collar positioned about both straight sections of the lug wrench and the second element so as to selectively rotatably couple the straight sections together, the first collar being selectively tightenable about the straight sections;

a second collar positioned about the first straight section and slidably positionable over the second straight section, the second collar being selectively tightenable about the straight sections, the second collar including a stud projecting inwardly therefrom, wherein the second handle can be rotated into adjacency relative to the first handle such that both of the handle longitudinal axis are substantially parallel for storage, and further wherein the second handle can be rotated so as to extend in a diametrically opposed direction relative to the first handle, with the second collar being slidably positionable onto the second straight section such that the stud of the second collar extends into the notch of the second straight section, wherein the collars can be tightened to lock the handles relative to one another.

2. The dual handle lug wrench of claim 1, wherein the collars each comprise a wall extending about the respective straight sections, the wall having spaced ends with a pair of flanges projecting in a substantially spaced and parallel orientation relative to one another from the ends of the wall; and a threaded wing bolt projecting through a first one of the flanges and being threadably engaged to a second one of the flanges, whereby tightening of the wing bolt will cause the flanges to be drawn together so as to clamp the wall about the respective straight sections.

* * * * *